United States Patent [19]
Lange et al.

[11] Patent Number: 5,856,252
[45] Date of Patent: Jan. 5, 1999

[54] DAMAGE TOLERANT CERAMIC MATRIX COMPOSITES BY A PRECURSOR INFILTRATION

[75] Inventors: Frederick F. Lange, Santa Barbara, Calif.; Anthony G. Evans, Rockport, Mass.; Wen Chang Tu, Menlo Park, Calif.

[73] Assignee: The Regents of the University of California, Oakland, Calif.

[21] Appl. No.: 942,953

[22] Filed: Oct. 2, 1997

Related U.S. Application Data

[63] Continuation of Ser. No. 774,996, Dec. 27, 1996, abandoned, which is a continuation of Ser. No. 484,855, Jun. 7, 1995, abandoned.

[51] Int. Cl.$^6$ .................................................. C04B 35/80
[52] U.S. Cl. .................. 501/95.2; 501/97.4; 501/128; 501/12
[58] Field of Search ................................. 501/95.2, 97.4, 501/128, 97.2, 12

[56] References Cited

U.S. PATENT DOCUMENTS

| | | |
|---|---|---|
| 4,461,842 | 7/1984 | Jamet . |
| 4,568,594 | 2/1986 | Hordonneau et al. . |
| 4,814,127 | 3/1989 | Toyoda . |
| 4,828,774 | 5/1989 | Anderson et al. ............... 501/12 |
| 4,917,941 | 4/1990 | Hillig et al. . |
| 5,025,045 | 6/1991 | Gawin et al. . |
| 5,077,243 | 12/1991 | Nakano et al. ................ 501/95 |
| 5,098,871 | 3/1992 | Ray . |
| 5,133,993 | 7/1992 | Steckert et al. . |
| 5,145,812 | 9/1992 | Arai et al. ..................... 507/97 |
| 5,167,271 | 12/1992 | Lange et al. . |
| 5,196,235 | 3/1993 | Parlier et al. . |
| 5,238,710 | 8/1993 | Ahmad et al. . |
| 5,246,736 | 9/1993 | Goujard et al. . |
| 5,294,460 | 3/1994 | Tani et al. . |
| 5,306,554 | 4/1994 | Harrison ....................... 428/283 |
| 5,336,522 | 8/1994 | Balhadere et al. . |
| 5,338,707 | 8/1994 | Inui ............................. 501/128 |
| 5,366,686 | 11/1994 | Mortensen et al. . |
| 5,459,114 | 10/1995 | Kaya et al. ..................... 501/97 |
| 5,494,867 | 2/1996 | Schwab et al. .................. 501/95 |

FOREIGN PATENT DOCUMENTS 2230259  11/1993  United Kingdom .

OTHER PUBLICATIONS

Walker et al., Preparation & Properties of Monolithic & Composite ceramics Produced by Polymer Pyrolysis; Ceramic Bulletin; pp. 916–923; 1983.

Tu et al., Liquid Precursor Infiltration & Pyrolysis of Powder Compacts, I: Kinetic Studies & Microstructure Development; sent to J. Am. Ceram. Society Tu et al., Liquid Precursor Infiltration & Pyrolysis of Powder Compacts:II; Fracture Toughness & Strength; sent to J. Amer. Ceram. Society Tu et al., Synthetic High–Temp. Wood: A Novel Class of Affordable, Damage Tolerant Ceramic Composite; sent to J. Am. Ceram. Soc.

Sudre et al., Effect of Inclusions on Densification: 1, Microstructural Devel. in an $Al_2O_3$ Matrix Cont. a High vol. Fraction of $ZrO_2$ Inclusions; J. Am. Ceram. Soc; v 75, n 3; 519–24; 1992

Lam et al., Mechanical Properties of Partially Dense Alumina Produced from Powder Compacts; J. Am. Ceram. Soc.; v 77, n 8; pp. 2113–2117; 1994

Lange et al., Powder Processing and Densification of Ceramic Composites; Mat. Res. Soc. Proc., Vol. 155; 1989

Lange et al., Pressure Filtration: Consolidation Kinetics & Mrchanics; Am. Ceram. Soc. Bull.; v 66; n 10; pp. 1498–1504; 1987

Velamakanni et al., New Meth. for Efficient Colloidal Particle Packing via Modulation of Repulsive Lub. Hrdration Forces; Langmuir; v 6; n 7, pp. 1323–1325; 1990

Zok et al., Packing Density of Composite Powder Mixtures; J. Am. Ceram. Soc.; v 74; n 8; pp. 1880–1885; 1991.

Lange et al., Method for Processing Metal–Reinforced Ceramic Composites; J. Am. Ceram. Soc.; v 73; n 2; pp. 388–393; 1990.

Folsom et al., Mech. Behavior of a Laminar Ceramic / Fiber–Reinforced Epoxy Composite; J. Am. Ceram. Soc.; v 75; n 11; pp. 2969–2975; 1992.

Bischoff et al., Microstructural Studies if the Interfacial Zone of a SiC–Fiber–Reinforced Lithium Aluminum Silicate Glass–Ceramic; J. Am. Ceram. Soc.; v 72; n 5; pp. 741–45; 1989.

Folsom et al., Flexural Properties of Brittle Multilayer Materials: 1, Modeling; J. Am. Ceram. Soc.; v 77; n 3; pp. 689–96; 1994.

Glass et al., Surface Modification of Ceramics by Partial Infiltration; Advanced Ceramic Materials; v 2; n 2; pp. 129–131; 1987.

Marple et al., Incorporation of Mullite as a Second Phase into alumina by an Infiltration Technique; Comm. of the American Ceramic Society; v 7. n 11; pp. C471–C473; 1988.

Sacks et al.; Prep. of $SiO_2$ Glass from Model Powder Compacts:III, Enhanced Densification by Sol Infiltration; J. Amer. Ceram. Soc.; v 71; n 4; pp. 245–249; 1988

Primary Examiner—Karl Group
Attorney, Agent, or Firm—Daniel L. Dawes

[57] ABSTRACT

Damage-tolerant, continuous fiber ceramic matrix composites are fabricated to fill the space between the fibers with a powder. The powder particles are heat treated to form a porous framework without shrinkage, which is then strengthened with an inorganic synthesized from a precursor in solution. High particle packing densities is achieved within the fiber preform using a small particle-to-fiber diameter ratio. Filling the interstices with a powder increases the composite density and also limits the size of the crack-like voids within the matrix. The ceramic matrix composite (CMC) has mechanical characteristics similar to those found in wood. It is also affordable and inherently oxidation resistant. The composite is characterized by a heterogeneous distribution of fibers within a porous matrix having a homogeneous, fine porosity. A residual stress from thermal expansion mismatch of the matrix and fibers is created in the composite. The illustrated embodiment uses $Al_2O_3$ fibers with either mullite or $Si_3N_4$ matrices.

2 Claims, 7 Drawing Sheets

FIGURE 1a

Fiber disrupts particle packing at surface = Wall Effect

Missing Particle Volume

FIGURE 1b

Increasing particle/fiber diameter Ratio

$Al_2O_3$ - $Al_2O_3$ Composite
(no residual stresses)

DAMAGE TOLERANT CERAMIC MATRIX COMPOSITES BY A PRECURSOR INFILTRATION

This application is a continuation of application Ser. No. 08/774,996, filed Dec. 27, 1996, now abandoned, which is a continuation of application Ser. No. 08/484,855, filed Jun. 7, 1995, now abandoned.

This invention was made with Government support under Grant No. N00014-92-J-1808 awarded by the Office of Naval Research. The Government has certain rights in this invention.

BACKGROUND OF THE INVENTION

1. Field of the Invention

The invention relates to the production of ceramic composite materials comprising a fibrous structure embedded in a matrix, and more particularly a structure of silicon carbide fibers in a matrix of ceramic.

2. Description of the Prior Art

Liquid precursor infiltration and pyrolysis can be used for processing ceramics and their composites. See S. J. Glass and D. J. Green, "Surface Modification of Ceramics by Partial Infiltration," Adv. Ceramic Mater., 2, 2, 129–131 (1987); B. R. Marple and D. J. Green, "Incorporation of Mullite as a Second Phase into Alumina by an Infiltration Technique," J. Am. Ceram. Soc., 71[11]C-471-C-473 (1988); M. D. Sacks and S. D. Vora, "Preparation of $SiO_2$ Glass from Model Powder Compacts: III, Enhanced Densification by Sol Infiltration," J. Am. Ceram. Soc., 71 [4]245–49 (1988); B. E. Walker, Jr., R. W. Rice, P. F. Becker, B. A. Bender, and W. S. Coblenz, "Preparation and Properties of Monolithic and Composite Ceramics Produced by Polymer Pyrolysis," Am. Ceram. Soc. Bull., Vol. 62, No. 8, 916–23 (1983); W. C. Tu and F. F. Lange, "Liquid Precursor Infiltration and Pyrolysis of Powder Compacts, I: Kinetic Studies and Microstructure Development," sent to J. Am. Ceram. Soc; W. C. Tu and F. F. Lange, "Liquid Precursor Infiltration and Pyrolysis of Powder Compacts, II: Fracture Toughness and Strength," sent to J. Am. Ceram. Soc.; and W. C. Tu, F. F. Lange and A. G. Evans, "A Novel, Damage-Tolerant Ceramic Composite (Synthetic, High-Temperature Wood)," sent to J. Am. Ceram. Soc.

The precursor is a liquid, comprising metal organic molecules dissolved in an appropriate solvent. The excess solvent is removed by evaporation and the solid precursor molecules are decomposed (pyrolyized) into the desired inorganic with a heat treatment. A powder compact can be infiltrated with a liquid precursor and pyrolyzed to synthesize an inorganic phase within the porous, ceramic. See S. J. Glass and D. J. Green, supra; B. R. Marple and D. J. Green, supra; M. D. Sacks and S. D. Vora, supra; B. E. Walker, Jr., R. W. Rice, P. F. Becker, B. A. Bender, and W. S. Coblenz, supra; and W. C. Tu and F. F. Lange, "Liquid Precursor Infiltration and Pyrolysis of Powder Compacts, I: Kinetic Studies and Microstructure Development," sent to J. Am. Ceram. Soc.

A variety of unique microstructures (graded, multi-phase, partially porous to fully dense, etc.), having unique thermo-mechanical properties can be fabricated. In addition, the pyrolyized precursor can be used to both increase the relative density and strengthen the powder compact without shrinkage. See, W. C. Tu and F. F. Lange, "Liquid Precursor Infiltration and Pyrolysis of Powder Compacts, I: Kinetic Studies and Microstructure Development," sent to J. Am. Ceram. Soc.

The lack of powder shrinkage during strengthening is an advantage for ceramic composites. Conventional strengthening by densification is constrained by the fibers and leads to the formation of crack-like voids. See, O. Sudre and F. F. Lange, "Effect of Inclusions on Densification: I, Microstructural Development in an $Al_2O_3$ Matrix Containing a High Volume Fraction of $ZrO_2$ Inclusions," J. Am. Ceram. Soc., 75[3]519–24 (1992).

BRIEF SUMMARY OF THE INVENTION

The invention is a method of fabricating a ceramic matrix composite comprising forming a matrix around fibers within a fiber preform by pressure filtration. The formed matrix and fiber preform is heated to strengthen the formed matrix and fiber preform. A precursor in solution is infiltrated into the heat treated matrix and fiber preform. The infiltrated precursor is pyrolyzed in the matrix and fiber preform to provide the ceramic matrix composite. As a result, a damage tolerant ceramic matrix composite is produced.

The step of forming a matrix around fibers within a fiber preform by pressure filtration comprises the step of forming a powder matrix around the fibers.

In another embodiment forming a matrix around fibers within a fiber preform by pressure filtration comprises forming the matrix around an arrangement of fibers including a woven cloth, a three-dimensional woven structure, a felt, and/or stacked layers of unwoven fibers.

In still another embodiment forming a matrix around fibers within a fiber preform by pressure filtration comprises forming the matrix around fibers made of a composition of an oxide system including single phase and multiple phase compositions.

The heat treated matrix and fiber preform is infiltrated by a precursor in solution and pyrolyzed a plurality of times in sequence, which in the preferred embodiment is at least three times in sequence.

In one embodiment the step of forming the matrix around the fibers also forms a matrix of silicon nitride fibers around a fiber preform of alumina fibers.

In another embodiment the step of forming the matrix around the fibers also forms a matrix of mullite fibers around a fiber preform of alumina fibers.

In the step of infiltrating a precursor in solution into the heat treated matrix and fiber preform polysilazane is infiltrated into the heat treated matrix and fiber preform. The infiltrated precursor is pyrolyzed in the matrix and fiber preform to provide the ceramic matrix composite forms a pyrolyzed form of amorphous silicon nitride.

More specifically, infiltrating a precursor in solution into the heat treated matrix and fiber preform infiltrates a mixed Si- and Al-alkoxide into the heat treated matrix and fiber preform.

In the preferred embodiment the step of forming a matrix around a fiber preform by pressure filtration forms a matrix in a fiber preform formed of fibers having a diameter which is equal to or less than a predetermined critical diameter that avoids cracking due to residual stresses. For example, the fibers have a diameter which is equal to or less than 40 microns.

In the illustrated embodiment a matrix is formed around a fiber preform by pressure filtration using repulsive particles in a slurry to obtain a high packing density.

In one embodiment the matrix is formed around a fiber preform by pressure filtration using a powder comprised of particles having a diameter and the preform is comprised of fibers having a diameter for which the ratio, R, of the diameter of the particles to the diameter of the fibers is less than 0.1.

In another embodiment the ratio, R, of the diameter of the particles to the diameter of the fibers is less than 0.05. The diameter of the particles is small enough to allow the particles to flow through the fiber preform. The particles are disposed into the preform using a slurry and are mutually repulsive to each other and repulsive to the fiber preform.

The invention is also defined as a ceramic matrix composite comprising a porous matrix having a thermal expansion coefficient. A plurality of fibers are disposed in the matrix. It is preferred that the thermal expansion coefficient of the fibers is greater than the thermal expansion coefficient of the matrix so that the fiber are in residual tension and the matrix in residual compression. As a result, a damage tolerant ceramic matrix composite is provided.

The matrix is fabricated in the form of a fine-scale porous framework having low resistance to crack extension and high tensile strength. The fine-scale porous framework is comprised of a plurality of fibers and powder packed around the plurality of fibers by pressure infiltration within a dispersed slurry and strengthened by cyclic infiltration and pyrolysis of a ceramic precursor solution. The fibers are strongly bonded to the porous matrix by means of a pyrolyzed ceramic precursor. In one embodiment the matrix is composed of silicon nitride, the fibers of alumina, and the ceramic precursor of polysilizane.

In another embodiment the matrix is composed of mullite, the fibers of alumina, and the ceramic precursor of a mixed Si- and Al-alkoxide.

The invention can be better visualized by now turning to the following drawings.

The invention and its various embodiments can be best understood in the context the illustrations provided by the following detailed description.

DETAILED DESCRIPTION OF THE PREFERRED EMBODIMENTS

Damage-tolerant, continuous fiber ceramic matrix composites are fabricated to fill the space between the fibers with a powder. The powder particles are heat treated to form a porous framework without shrinkage, which is then strengthened with an inorganic synthesized from a precursor in solution. High particle packing densities is achieved within the fiber preform using a small particle-to-fiber diameter ratio. Filling the interstices with a powder increases the composite density and also limits the size of the crack-like voids within the matrix.

The ceramic matrix composite (CMC) has mechanical characteristics similar to those found in wood. It is also affordable and inherently oxidation resistant for the preferred selection of materials. The composite is characterized by a distribution of fibers within a porous matrix having a homogeneous, fine porosity. A residual stress from thermal expansion mismatch of the matrix and fibers is created in the composite. The illustrated embodiment uses $Al_2O_3$ fibers with either mullite or $Si_3N_4$ matrices.

Figure 1A:
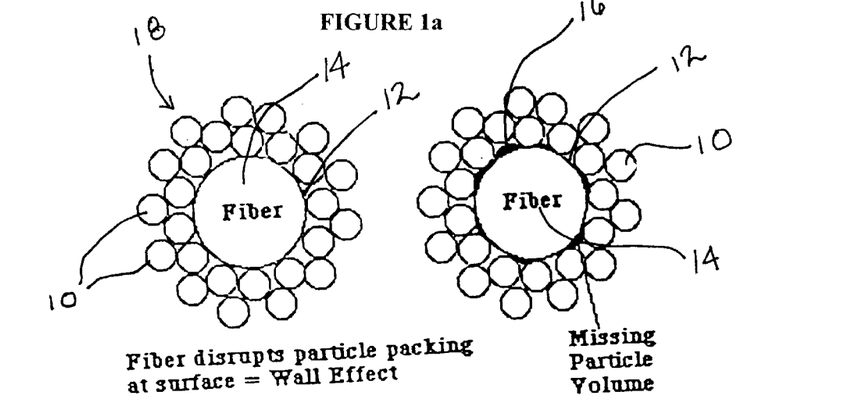
FIG. 1a is a diagrammatic cross-sectional depiction of a fiber packed in a matrix powder of particles showing the missing particle volume.
Figure 1B:
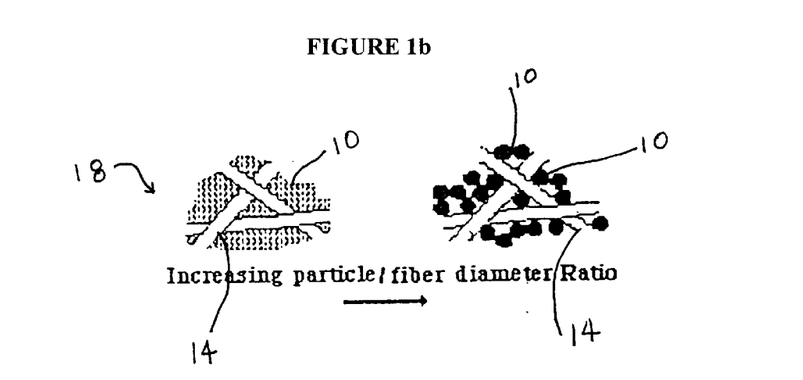
FIG. 1b is a diagrammatic side view of fibers packed in a matrix powder of particles showing the dependence of packing density on particle-to-fiber diameter ratios.

A powder matrix of particles 10 surrounding fibers 14 as shown in FIGS. 1a and b can be made strong (>200 MPa) by a cyclic precursor infiltration/pyrolysis processing method. In addition, the porous matrix, generally denoted by reference numeral 18, itself can induce cracking mechanisms that provide damage tolerant behavior. This discovery implies that "weak" interfaces are not necessarily a former requirement of damage tolerant, high strain-to-failure ceramic matrix composites reinforced with strong, ceramic fibers 14. For two different composite systems disclosed below, fibers 14 are well bonded to the matrix 18 and do not appear to be degraded by the processing. In one of these systems, since both the matrix (mullite) 18 and fibers (alumina) 14 are oxides, high temperature degradation will not occur in oxidizing environments.

Figure 2:
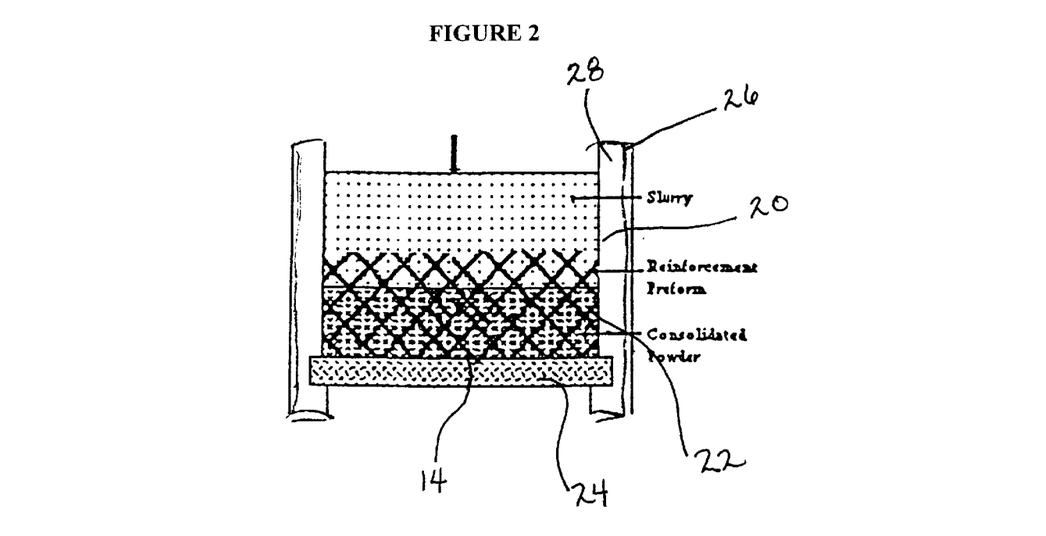
FIG. 2 is a diagrammatic side cross-sectional view of a pressure infiltration mold used to produce the composites of the invention.

The processing method disclosed here in connection with FIG. 2 involves three steps:
i) the packing of a powder around fibers 14 by pressure filtration to form matrix 18;
ii) a heat treatment to strengthen the powder matrix 18 without shrinkage; and
iii) the additional strengthening of the matrix 18 with an infiltrated precursor in solution that pyrolysises to a desired, inorganic material. The inorganic can have a different composition from either the fibers 14 or matrix 18. Because the precursor does not completely fill the volume between particles 10 after pyrolysis, the matrix phase contains a residual void phase even after multiple infiltration-pyrolysis.

First we will consider the mechanical properties of partially dense materials produced from powders to show that a porous matrix 18 can be strong. Second, we will disclose that the packing density of particles 10 around fibers 14 is highest when the particle-to-fiber diameter ratio is small. Third, the kinetics and mechanics of the infiltration/pyrolysis process will be described. Fourth, the damage tolerant mechanical behavior of two composite systems disclosed as examples will be demonstrated.

In the preferred embodiment only fibers 14 having a diameter less than a predetermined magnitude are used. The reason is to exclude fibers 14 with large diameters to avoid cracking around and between the large diameter fibers 14 as the composite is cooled from its fabrication temperature. This cracking is caused by residual stresses that arise during the cooling due to the difference in the thermal expansion (or contraction) coefficient of fibers 14 and matrix 18. Cracking is empirically observed around and between large diameter fibers 14 of about 140 microns in diameter, but not around and between smaller diameter fibers 14, namely about 20 microns.

This observation was unexpected since it was thought that the magnitude of the stress that could cause cracking does not depend on the diameter of the fiber 14. That is, the magnitude of the stress both within the fibers 14 and within the matrix surrounding the fibers 14 was not considered to be a function of the fiber 14 size in any way. It was later appreciated, however, that stress is also a function of fiber 14 diameter. If $\sigma^2 R$ is greater than a critical value, where $\sigma$ is the residual stress and R the fiber 14 diameter, then cracking can occur during cooling from the fabrication temperature. In the alumina-fiber-mullite-matrix composite, the critical fiber diameter is about 40 microns, i.e. to avoid cracking, fiber diameters in alumina-fiber-mullite-matrix composites must be less than 40 microns.

Mechanical Properties of Partially Dense Materials Formed From Powders

Porous materials can have high specific mechanical properties. Such solids, when formed from powders, transmit force through structural units. These units have morphological characteristics which differ from those for cellular materials. See, David C. C. Lam, F. F. Lange and A. G. Evans, "*Mechanical Properties of Partially Dense Alumina Produced from Powder Compacts*," J. Am. Ceram. Soc. 77[8] 2113–17 (1994).

Unlike cellular materials, the mechanical properties are linear functions of porosity when normalized by their respective values for the fully dense material. See, David C. C. Lam, F. F. Lange and A. G. Evans, supra. The elastic modulus with a defined amount of porosity, E, and the critical stress intensity factor, $K_c$, with a defined amount of porosity are $$E = E_o \, F(\text{density})$$

and, $$K_c = K_o \, F(\text{density}) \tag{1}$$

where Eo is the elastic modulus of a fully dense material, $K_o$ is the critical stress intensity factor of a fully dense material, and F is a function of the density of the material. Similar relations are also obtained when increased density is achieved by cyclic precursor infiltration and pyrolysis. See, W. C. Tu and F. F. Lange, "*Liquid Precursor Infiltration and Pyrolysis of Powder Compacts, II: Fracture Toughness and Strength*," supra. Hence, both E and $K_c$ can be optimized by starting with a powder compact having the highest possible particle packing density.

More importantly, the strength of the partially dense body is controlled by the size of the crack-like flaws that pre-exist within the initial powder compact. See, David C. C. Lam, F. F. Lange and A. G. Evans, "*Mechanical Properties of Partially Dense Alumina Produced from Powder Compacts*," supra. Thus, partially dense powder compacts (and matrices in fiber reinforced composites) could be strong, despite residual porosity, if particles 10 were packed to a high relative density and the flaw size within the powder was minimized.

Packing of Particles and Reinforcements

Particle morphology, interparticle forces and the particle size distribution are the major factors controlling the density to which mass can be consolidated in the form of powders. See, F. F. Lange, D. C. C. Lam, and O. Sudre, "*Powder Processing and Densification of Ceramic Composites*," Mat. Res. Soc. Symp. Proc. 155 [4] 309–18 (1989). The effect of interparticle forces on packing density is best illustrated when powder is packed from the slurry state by pressure filtration, with interparticle forces controlled by surface-chemical methods through pH control, by polyelectrolytes, etc. The highest packing density is achieved when particles 10 are repulsive. Whether long-range or short-range, the repulsive force acts as a lubricant to allow particles 10 to rearrange and pack to their highest density. See, F. F. Lange and K. T. Miller, "*Pressure Filtration: Kinetics and Mechanics*," Bul. Am. Ceram. Soc. 66 [10], 1498–1504 (1987); and B. V. Velamakanni, J. C. Chang, F. F. Lange, and D. S. Pearson, "*New Method for Efficient Colloidal Particle Packing via Modulation of Repulsive Lubricating Hydration Forces*," Langmuir 6 [7] 1323–5 (1990). Also, above a critical pressure, their packing density is not affected by the applied pressure. In contrast, the packing density achieved in bodies produced from flocced slurries is much lower and pressure sensitive because strongly attractive interparticle forces produce a cohesive, connective network before they are packed. In effect, the coefficient of friction between particles 10 is high when they are strongly attractive and particle rearrangement during packing is inhibited.

Dry powders behave much like the flocced slurry. Repulsive particles 10 are required to achieve a high packing density.

The particle-to-fiber diameter ratio (r) greatly affects the packing density of particles 10 around fibers 14. See, F. F. Lange, D. C. C. Lam, and O. Sudre, "*Powder Processing and Densification of Ceramic Composites*," supra. One reason for the lower packing density is the "wall effect", shown in FIG. 1a. When particles 10 are packed against a wall, such as a fiber surface 12 of a fiber 14, extra spaces or volume 16 exist that would have been partially filled with particles 10 if the surface 12 did not exist. Zok et al. in "*The Packing Density of Composite Powder Mixtures*," at J. Am. Ceram. Soc. 74 [8] 1880–5 (1991) have shown that the extra void volume 16 introduced by the "wall effect" increases with the ratio, r. When r>0.1, a limited number of particles 10 can fill the interstices between the fibers 14 as shown in FIG. 1b. The geometrical restriction of particle packing limits the packing density of the powder, and inhibits the application of powder methods in forming composite systems unless sub-micron particles 10 of the desired powder can be obtained, The problem of packing powders within three dimensional preforms was solved by using pressure filtration. See, Jamet et al., "*Composite Ceramique: Relations Entre Microstructures et. Rupture*," L'Aeronautique et. L'Astronautique, No. 123/124, 128–42 (1987). Our adaptation of this method is shown in FIG. 2. In this process the consolidated layer builds up within preform 22, fixed to a filter 24.

Powders can be packed within preform 22 provided that three conditions are satisfied. First, the particles 10 must be small enough to flow through the preform channels and smaller yet (r<0.05) to achieve high packing densities for the reasons described above. Second, the particles 10 in slurry 20 must be repulsive (flocced slurries clog the channels). Third, repulsive surface forces must exist between the preform 22 and the particles 10.

High pressures are desirable because of the parabolic kinetics of pressure filtration and the low permeability of highly packed, sub-micron powders. During filtration, both the reinforcement material of preform 22 and surrounding powder matrix 18 are compressed. Both relieve their stored strain when the pressure is removed. Since each has different strain recoveries, stresses arise, which can damage these bodies. Bodies formed from dispersed slurries still flow after consolidation and can dissipate stresses. The recovery is time dependent on the flow of liquid from the surface to the interior of the body. Thus, the rheology of the consolidated body must be understood and controlled to avoid processing damage induced by the reinforcements. See, F. F. Lange, B. V. Velamakanni, and A. G. Evans, "*Method for Processing metal-Reinforced Ceramic Composites*," J. Am. Ceram. Soc. 73 [2] 388–93 (1990).

Infiltration Physics and Kinetics

The infiltration of a dry, porous medium containing gas occurs by two different mechanisms. See, W. C. Tu (part I). First, capillary plus applied pressure cause a wetting liquid to flow into a granular medium; flow will diminish and then stop when the pressure of the entrapped gas causes the differential pressure to approach zero. Second, gas can diffuse through the liquid from the pressurized, entrapped gas to the surface. Such gas diffusion is controlled by its solubility at higher pressures.

The flow of liquid into a porous medium by differential pressure, dP is described by Darcy's law $$h = [2K\Delta P/\eta]^{1/2} t^{1/2} \quad (2)$$

where h is the distance of liquid intruded within a period t, K is the permeability of the porous body and $\eta$ is the viscosity of liquid. Gas diffusion obeys Fick's law $$h = (2D_g \beta P_i)^{1/2} t^{1/2} \quad (3)$$

where $D_g$ is the diffusion coefficient of the gas within the liquid, $\beta$ is Henry's constant and $P_i$ is the pressure of the entrapped gas. Although both phenomena are concurrent, the flow of liquid due to differential pressure initially dominates. Once the gas within the compact is sufficiently compressed, gas diffusion becomes dominant.

When the intruded precursor is converted to an inorganic during heat treatment, the void space is partially filled with pyrolyzed precursor without shrinkage of the powder. The kinetics of subsequent liquid precursor infiltration cycles depend on the permeability of the pyrolyzed precursor, which in turn depends on microstructural development during the heat treatment subsequent to pyrolysis. Surface cracks can form within the powder compact during either precursor drying or pyrolysis. They can be avoided by strengthening the powder compact by forming small necks between touching particles 10 by evaporation-condensation. Moreover, precursor molecules concentrate near the surface as the solvent is removed by drying. This can be prevented by gelling the precursor prior to drying. For example, a Zr-acetate is gelled by soaking the infiltrated bodies in aqueous $NH_4OH$.

The size distribution of the crack-like voids produced within a pyrolyized precursor is proportional to the size distribution of the voids within the initial powder compact. Thus partly filling of the void phase within a fiber preform 22 decreases the size of the crack-like voids during precursor pyrolysis to the size of the particle interstices, instead of the much larger interstices between fibers 14.

Ceramic Wood

When two intrinsically brittle materials are combined, damage tolerance can be achieved whenever cracks are induced to deflect or debond along planes parallel to the loading direction. This concept is well-known and utilized in wood, shells, etc. It has also been demonstrated on various synthetic, layered and laminated materials. C. A. Folsom, F. W. Zok, F. F. Lange, and D. B. Marshall, "*The Mechanical Behavior of a Laminar Ceramic/Fiber-Reinforced Epoxy Composite*," J. Am. Ceram. Soc. 75 [9], 1–7 (1992). However, the synthetic materials have had two restrictions. First, they usually have unacceptably low transverse properties (normal to the reinforcing phase), and second their processing is achieved by methods (such as vapor deposition) not compatible with the affordable manufacturing of structural components.

Most damage tolerant ceramic matrix composites (CMCs) have implemented this requirement by using a thin interphase between fiber 14 and matrix 18. The interphases used in most commercial products consist of either C or BN. These interphases oxidize and cause embrittlement. See, E. Bischoff, M. Ruehle, O. Sbaizero and A. G. Evans, J. Am. Ceram. Soc., 72 [5] 741–45 (1989).

Here, a new concept is developed and exploited that permits the creation of low cost, damage tolerant CMCs, inherently resistant to oxidation embrittlement because it does not require a matrix/fiber interphase. The ensuing composites have performance characteristics similar to those demonstrated by various natural materials, particularly wood.

The materials described here use high-strength ceramic fibers 14 in a porous ceramic matrix 18. The materials are selected to satisfy the two basic criteria needed to achieve damage tolerant behavior, according to the scheme elaborated elsewhere. First, fibers 14 have a larger thermal expansion coefficient than matrix 18. In consequence, the fibers are in residual tension, whereas the matrix regions are in residual compression. Second, matrix 18 is comprised of a fine-scale, porous framework having a relatively low resistance to crack extension, Kc, but good tensile strength. The latter criteria can be satisfied by using the CMC processing method described above, viz., packing powders around fibers 14 by the pressure filtration of particles 10 within a dispersed slurry, and strengthening powder matrix 18 by the cyclic infiltration of a ceramic precursor. This behavior is exemplified by $Al_2O_3$ fibers 14 in porous matrices of either $Si_3N_4$ or mullite.

Consider the manufacture of a composite as described above where the matrix is strong, yet deflects cracks because it has a low fracture resistance because it is porous and under compression. Current processing routes for CMCs involve powder, fluid and vapor methods. In the conventional powder method, pressureless sintering is limited because fibers 14 constrain the shrinkage. Then, pores redistribute and produce crack-like voids ( see, O. Sudre and F. F. Lange, "*The Effect of Inclusions on Densification. Part I: Microstructural Development in an $Al_2O_3$ Matrix Containing a High Volume Fraction of $ZrO_2$ Inclusions*," J. Am. Ceram. Soc. 75 [3] 519–24 (1992)). Moreover, the use of hot pressing to suppress such void formation is limited to the fabrication of simple geometrical shapes.

Nonpowder methods include chemical vapor infiltration (CVI), as well as the cyclic infiltration and pyrolysis of polymeric ceramic precursors. The matrix deposition rate for CVI decays substantially as the size of the channels within the fiber preform decreases. Furthermore, uniformly dense microstructures can only attain at very low deposition rates. The economics are thus unfavorable. Infiltration and pyrolysis of a precursor in solution have economic advantages over CVI. However, the large shrinkage that accompanies pyrolysis, again produces large, crack-like voids.

To obviate the formation of crack-like voids, while maintaining affordability, a hybrid method is proposed. In this method, elaborated below, a powder is first packed within a fiber preform 22 by pressure filtration. The basic requirements for such infiltration are that particles 10 flow through the preform channels and must not be attached either to each other or to fibers 14. Powder matrix 18 is then strengthened without shrinkage into a porous framework by cyclic infiltration of a precursor in solution, followed by pyrolysis. The basic issues concerning densification without shrinkage have been addressed elsewhere. See, W. C. Tu and F. F. Lange, "*Liquid Precursor Infiltration and Pyrolysis of Powder Compacts, Part I: Kinetic Studies and Microstructure Development and Part II: Fracture Toughness and Strength,*" sent to J. Am. Ceramic Soc. This is a critical element in the present concept for producing affordable, damage-tolerant CMCs.

Materials and Procedures

Silicon nitride, mullite and aluminum oxide have been selected as the matrix 18 materials; processing of only the silicon nitride matrix composite will be discussed below. Both silicon nitride and mulite have a low thermal expansion coefficient ($E_{sn}=3\times10^{-6}C^{-1}$ and $E_{mu}=5.5\times10^{-6}C^{-1}$) and a moderate elastic modulus ($E_{sn}=300$ GPa and $E_{mu}=200$ GPa) relative to the polycrystalline $Al_2O_3$ fibers 14 ($=8\times10^{-6}C^{-1}$, E=400 GPa). For these matrices the residual stress in the matrix 18 is compressive (e.g., for the $Si_3N_4/Al_2O_3$ system, b approx.=$5\times10^{-6}C^{-1}$). Moreover, these systems have a relatively low overall composite thermal expansion coefficient and a low modulus, such that thermal stresses upon transient heating or cooling would be minimal. In the example where aluminum oxide is the matrix the thermal expansion differential between the matrix and fibers is nil.

Consider now a detailed example of how one such composite is created. In order to create these composites, dispersed aqueous $Si_3N_4$, mullite and alumina slurries with a particle size=<1 mm were first prepared. Slip casting was used to pack the particles 10 around fibers 14. The as-received $Al_2O_3$ fibers 14 were cut into 35 mm lengths. Fibers were dip coated into slurry 20 and stacked in a Teflon mold 26 in contact with plaster of Paris as shown in FIG. 2. Slurry 20 was poured into mold 26 to cover fiber preform 22 and packed by filtration under the capillary pressure provided by plaster of Paris interior 28. After complete powder consolidation, the resulting bodies were partially dried in mold 26, removed and then fully dried at 60° C. The excess powder layer, on top of the fiber/powder composite, was removed to prevent matrix 18 cracking upon further processing.

The $Si_3N_4$ matrix composite compacts were subsequently heat treated at 1250° C. for 10 hours under flowing $N_2$ to partially strengthen the $Si_3N_4$ matrix 18 without shrinkage by forming necks between the touching $Si_3N_4$ particles 10, by evaporation-condensation. To fully strengthen this powder matrix 18, infiltration, pyrolysis and heat treatment procedures were implemented using polysilazane. This precursor pyrolysises to an amorphous "$Si_3N_4$".

Up to three such cycles were typically employed with heat treatment at 1200° C. for 4 hours after each pyrolysis. A similar procedure was used to produce a mullite matrix 18, where a mixed Al, Si-alkoxide was used to strengthen the mullite powder matrix 18 after gelation, drying and heat treatment in air at 1250 deg. C. for 1 to 4 hours. A similar procedure was used to produce the alumina matrix, except an Al-alkoxide was used to strengthen alumina powder matrix 18 at gelation, drying and heat treatment at 800 degrees C. for 1 to 4 hours.

Microstructural Characteristics

Figure 3:
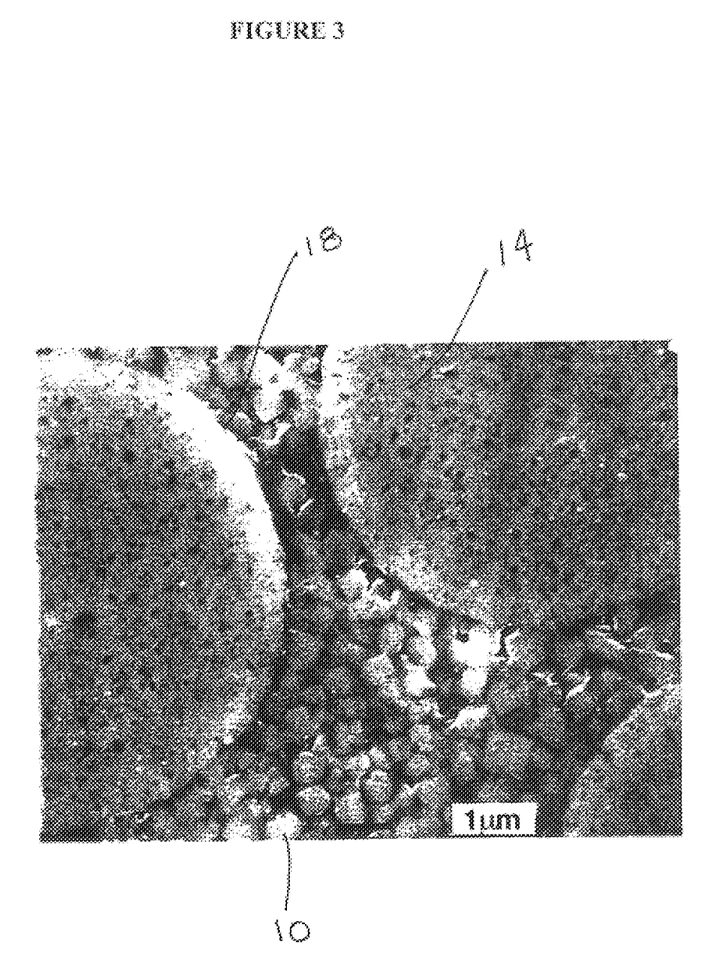
FIG. 3 is microphotograph showing the packed structure of a fiber ceramic matrix composite produced by the method of the invention.

Scanning electron microscopy was used on polished and fractured sections to highlight the microstructural features. FIG. 3 illustrates a typical polished section of the $Al_2O_3/Si_3N_4$ composite showing that the cubic-like, $Si_3N_4$ particles 10 are bonded together with amorphous '$Si_3N_4$' and $Al_2O_3$ fibers 14 are bonded to matrix 18 with the same amorphous '$Si_3N_4$'. The dimension of the pores seen in FIG. 3 are limited in size to the space between particles 10. There is no evidence of crack-like, shrinkage flaws larger than the particles.

Figure 6A:
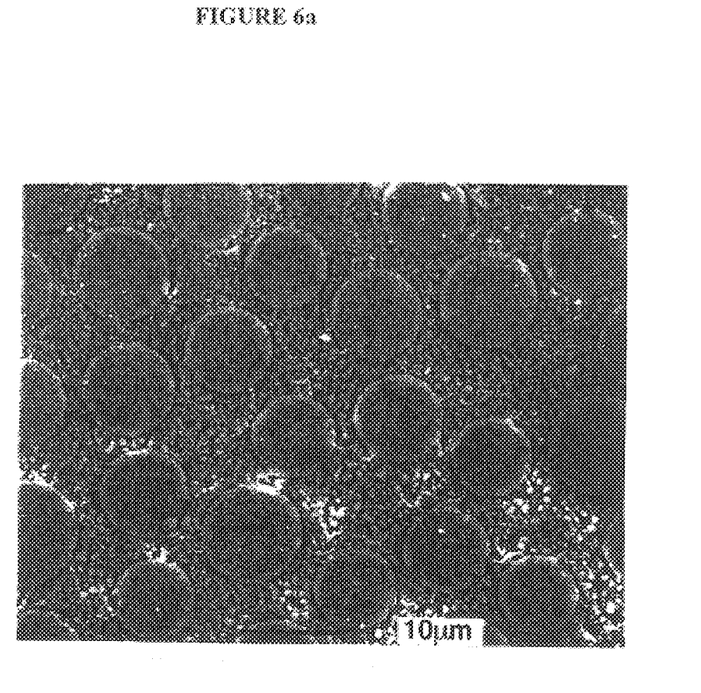
FIGS. 6a and b are photomicrographs in a first and an enlarged scale showing the separation of the fibers in the matrix and the porosity at the interface between the fibers and the matrix.
Figure 6B:
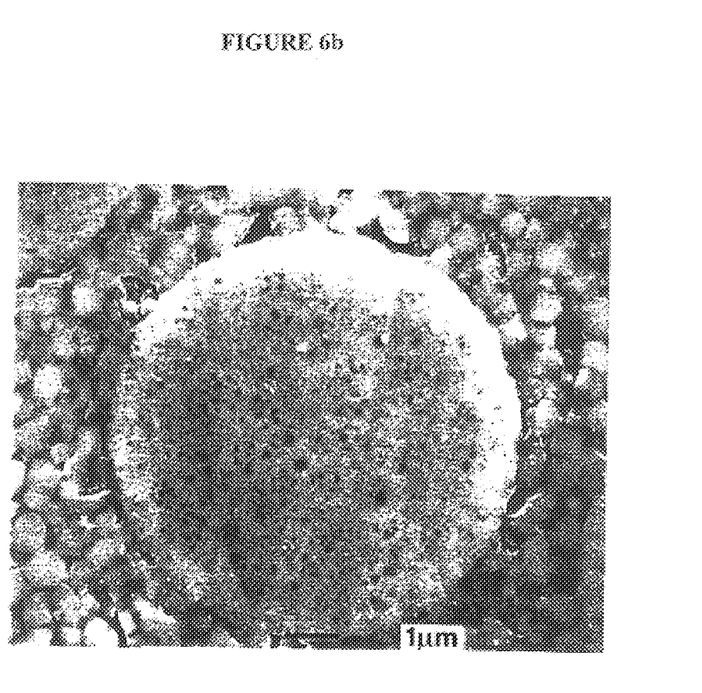

Closer inspection of the fiber/matrix interface as seen in FIG. 6b indicates that there has been some sintering and neck formation at the interface with a slightly larger concentration of pores than in surrounding matrix 18.

Mechanical Characterization

Figure 4A:
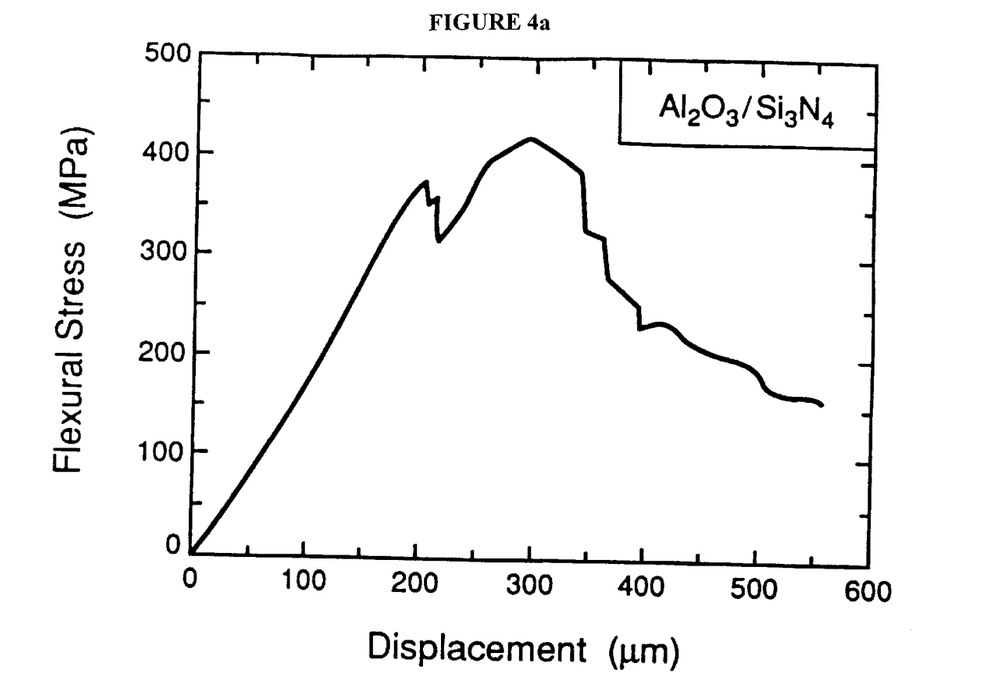
FIGS. 4a, b and c are graphs of the flexure stress verses displacement of $Al_2O_3/Si_3N_4$, $Al_2O_3$ composites respectively prepared according to the method of the invention.
Figure 4B:
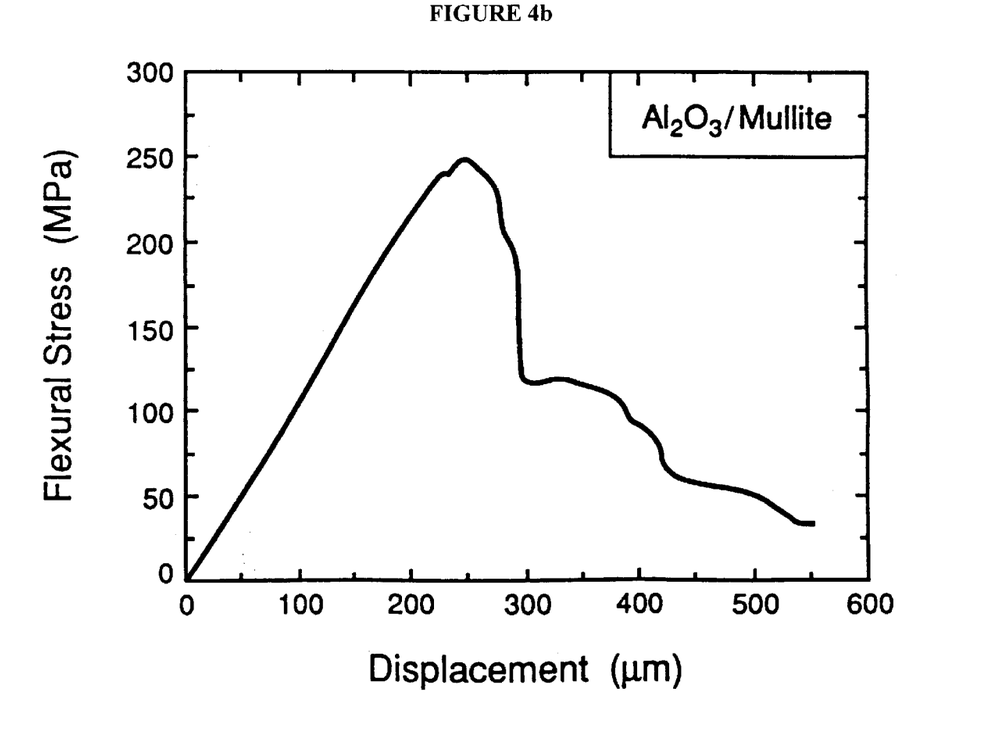
Figure 4C:
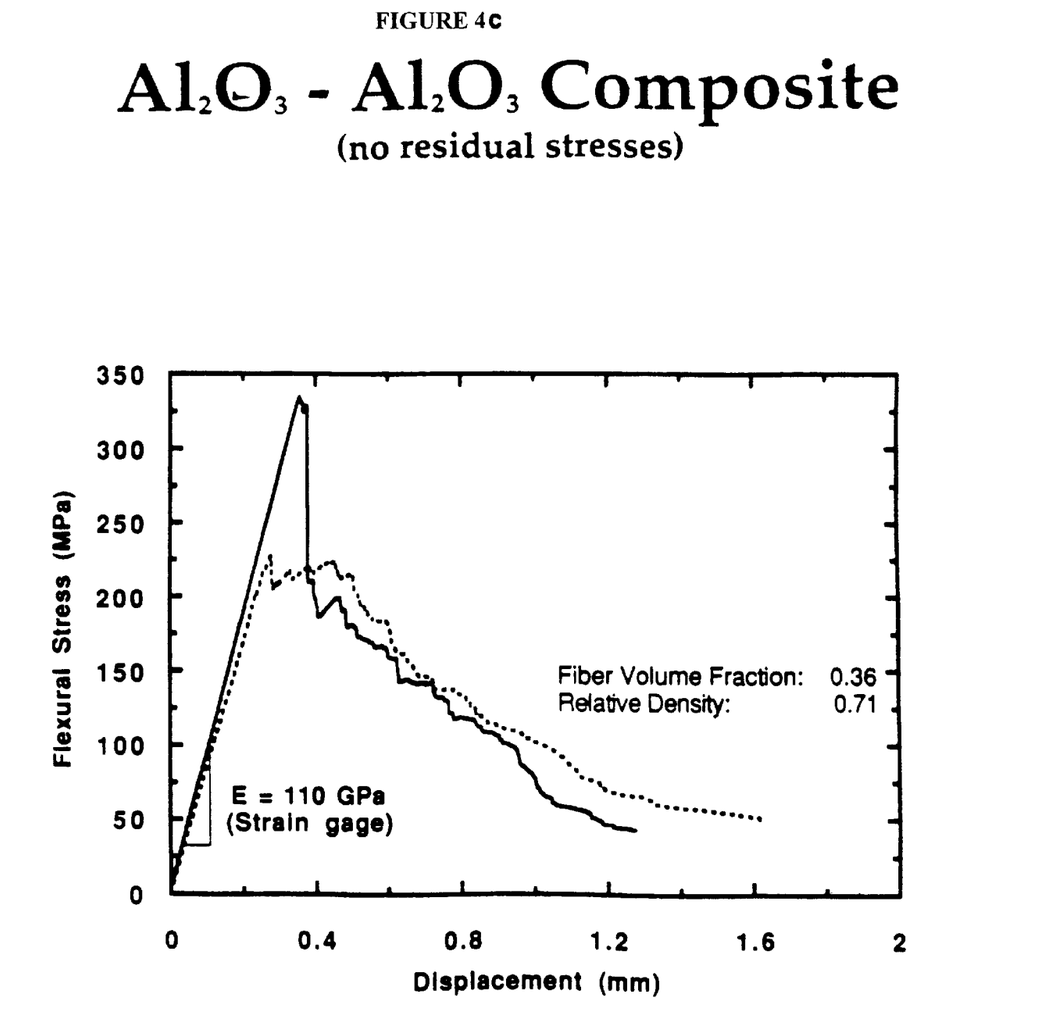

Several tensile and flexural tests have been used to demonstrate the damage tolerance of these materials. Simple four-point flexure on beams with dimensions 2×3×30 mm indicate the load, displacement behavior shown in FIGS. 4a, b and c. FIGS. 4a, b and c show the load, displacement behavior of both the $Al_2O_3/Si_3N_4$, $Al_2O_3/Mullite$ and $Al_2O_3/Al_2O_3$ composites respectively. Extensive inelastic deformation is evident. Stepwise load drops 30, beyond the peak stress 32, are characteristic of the behavior laminar composites with crack deflecting interfaces. See, C. A. Folson, F. W. Zok and F. F. Lange, "*On the Flexural Properties of Brittle Multilayer Material: Modeling,*" J. Am. Ceram. Soc.77 [3] 689–96 (1994).

For all three composites the initial deformation is elastic. In this elastic regime, the composite modulus for the $Si_3N_4/Al_2O_3$ is E=280 GPa. For the same composite, the inelastic deformation commences at a nominal tensile stress of about 350 MPa. As shown beyond the peak load, unlike conventional brittle material that exhibit catastrophic failure, the composite materials shown in FIG. 4 all exhibit additional strain during sequential crack extension in the manner that includes the crack deflection described above. Such behavior is indicative of good structural integrity in thermally loaded systems.

Figure 5A:
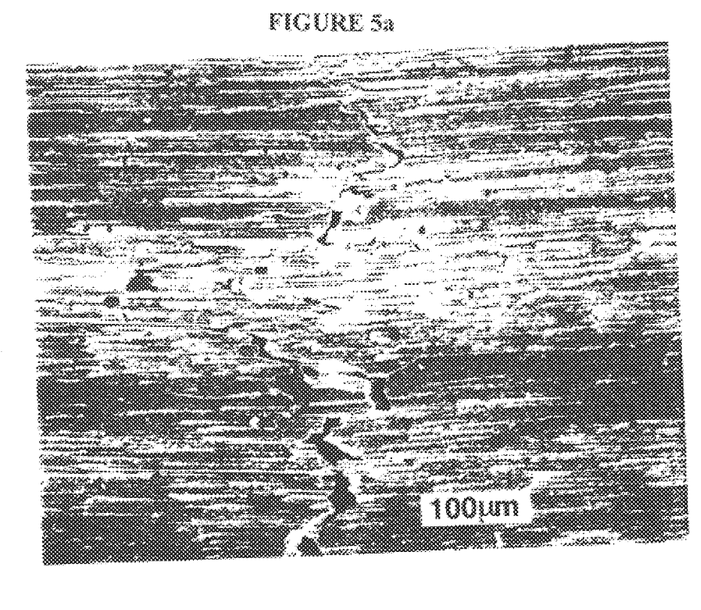
FIG. 5a is a microphotograph which illustrates the "wood" like fracture path of the $Al_2O_3/Si_3N_4$ composite as seen in a vertical cross section through the composite.

Simultaneous observations made on the tensile surface (FIG. 5a) indicate that fracture occurs by delamination cracks within the matrix 18-dominated zones. FIG. 5a illustrates the "wood" like fracture path of the $Al_2O_3/Si_3N_4$ composite as seen in a vertical cross section through the composite. The two other composites behave in a similar manner.

Figure 5B:
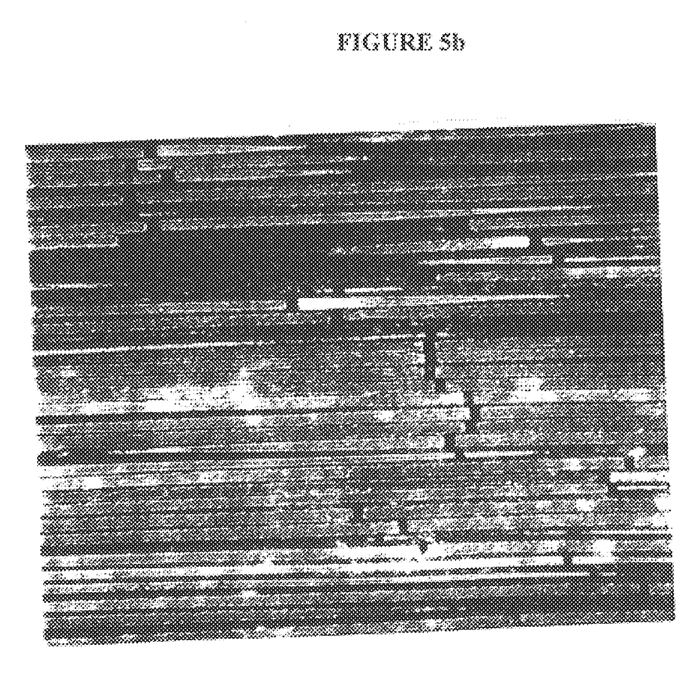
FIG. 5b illustrates a typical fracture surface seen in top plan view showing that the fibers are bonded together with the powder matrix, and that crack deflection occurs only within the matrix.

FIG. 5b illustrates a typical fracture surface seen in top plan view, showing that fibers 14 are bonded together with powder matrix 18, and that crack deflection occurs within matrix 18. The nature of the delaminations is also evident on the fracture surface (FIG. 5b) with extensive regions of cracking normal to the rupture plane. This behavior is reminiscent of that found in wood.

Figure 7:
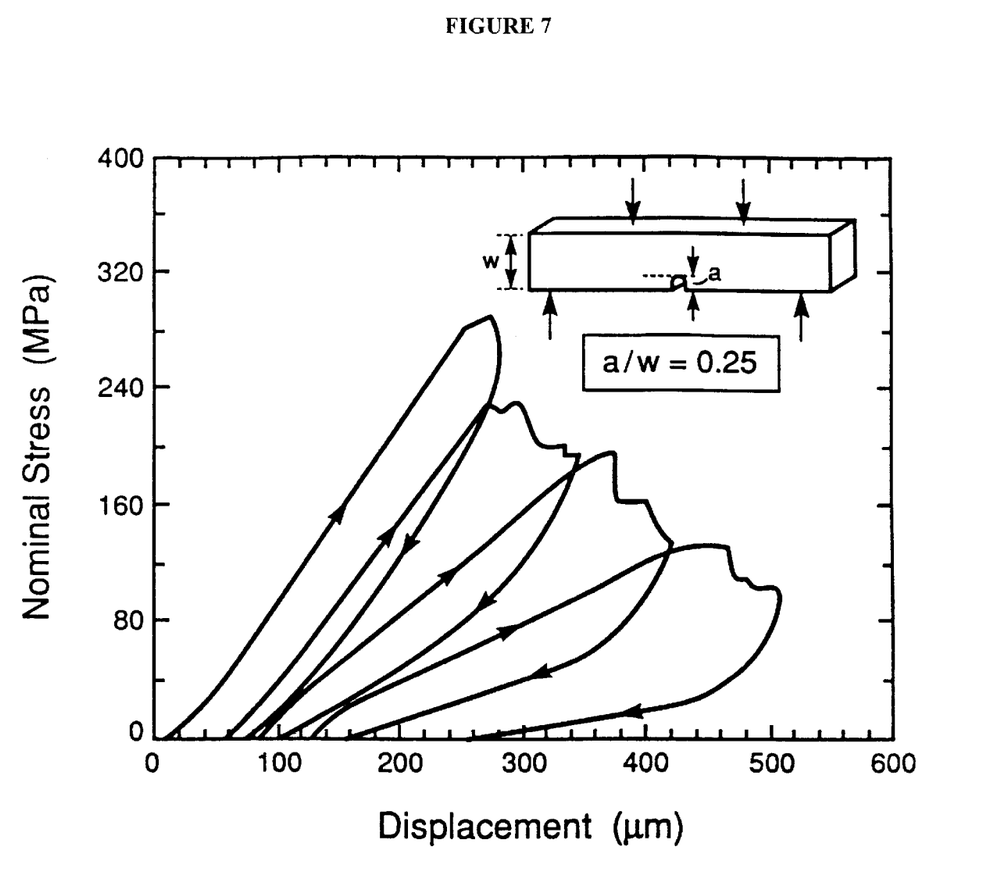
FIG. 7 is a graph illustrating the stress/displacement behavior of a notched flexure specimen.

In some specimens, edge notches have been introduced and testing performed in flexure. The resulting load, displacement behavior is illustrated in FIG. 7. Stable softening occurs with relatively wide hysteresis loops and appreciable permanent strains, again indicative of damage tolerance. In these tests, delamination always occurred from the base of the notch shown in FIG. 7. Thereafter, damage progressed sequentially through the remaining section, as in the unnotched specimens.

In summary the experiments demonstrate that flaw tolerant ceramic matrix 18 composites can be made by deliberately inducing delamination modes of crack extension. The material then behaves in a manner analogous to several naturally occurring materials, such as wood.

The development of stable damage relies on three principal factors. First, fiber 14 should be separated in order to create matrix-only pathways for the delamination crack as illustrated in FIG. 6a. Second, the matrix-only region should have controlled porosity to ensure that they have a mode II fracture energy lower than the mode I fracture energy of the fibers. Third, it is desired, but not necessary that the matrix regions 18 should be subject to residual compression: achieved by selecting a matrix 18 with a lower thermal expansion coefficient than the fiber. When these criteria are satisfied, the specifics of damage tolerant behavior depend on the actual constituent properties and the applied stress.

It should now also be clear that damage tolerant continuous fiber ceramic matrix composites can be produced by a powder route that packs particles 10 within a fiber preform 22 by pressure filtration and then strengthening powder matrix 18 by a cyclic precursor infiltration method. High particle packing densities can be achieved within the fiber preform 22 provided that the particle-to-fiber diameter ratio is small. Filling the interstices with particles 10 first, limits the size of the crack-like voids within the matrix 18 and thus optimizes its strength. The matrix 18 itself can act as a crack deflecting phase such that an all oxide ceramic matrix composite can be fabricated.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A ceramic matrix composite comprising:
   a plurality of alumina fibers, not precoated and having an average diameter of 40 $\mu$m of less; and
   a porous matrix impregnated about said fibers comprising:
      background mullite particles having an average diameter smaller than that of the alumina fibers so that a ratio between particle diameter and fiber diameter is less than 0.1;
      packing voids between the mullite particles; and
      interstitial mullite binding particle to particle and particle to fiber forming a nonshrinking matrix through which cracks propagate without entering the fibers when the ceramic matrix composite fails.

2. A ceramic matrix composite comprising a matrix and fiber reinforcements embedded within said matrix, said composite being formed by the steps:
   forming a mullite particle matrix around not precoated alumina fibers within a fiber preform by pressure filtration, wherein the fibers are 40 $\mu$m or less in diameter and the mullite particles are selected so that a ratio of particle diameter to fiber diameter is 0.1 or less;
   heat treating said formed matrix and fiber preform to strengthen said formed matrix and fiber preform without shrinkage;
   infiltrating a precursor solution of mixed silicon and aluminum alkoxides into said heat treated matrix and fiber preform; and
   pyrolyzing said infiltrated precursor in said matrix and fiber preform to create an interstitial matrix of mullite binding particle to particle and particle to fiber providing a nonshrinking matrix through which cracks propagate without entering the fibers when the ceramic matrix composite fails.

* * * * *